US005869560A

United States Patent [19]
Kobayashi et al.

[11] Patent Number: 5,869,560
[45] Date of Patent: Feb. 9, 1999

[54] SEALING MATERIALS AND BUILDING COMPONENTS USEFUL FOR CLEAN ROOMS

[75] Inventors: Sadao Kobayashi; Masayuki Imafuku; Yoshihide Wakayama, all of Tokyo, Japan

[73] Assignee: Taisei Corporation, Tokyo, Japan

[21] Appl. No.: 685,428

[22] Filed: Jul. 24, 1996

[30] Foreign Application Priority Data

| Jul. 27, 1995 | [JP] | Japan | 7-192091 |
|---|---|---|---|
| Jul. 27, 1995 | [JP] | Japan | 7-192092 |
| Jul. 27, 1995 | [JP] | Japan | 7-192093 |
| Jul. 4, 1996 | [JP] | Japan | 8-174642 |
| Jul. 4, 1996 | [JP] | Japan | 8-174643 |
| Jul. 4, 1996 | [JP] | Japan | 8-174644 |

[51] Int. Cl.$^6$ .............................. C08L 27/06; C08K 5/02
[52] U.S. Cl. .............. 524/487; 524/488; 524/472; 524/567; 524/568; 524/297; 524/317; 524/462; 524/463; 524/464; 524/465; 524/466; 524/467; 524/468
[58] Field of Search ..................... 524/487, 488, 524/567, 568, 297, 317, 462, 463, 464, 465, 466, 467, 468, 472

[56] References Cited

U.S. PATENT DOCUMENTS

| 5,314,941 | 5/1994 | Yamanaka et al. | 524/425 |
|---|---|---|---|
| 5,416,146 | 5/1995 | Kushida et al. | 524/297 |
| 5,446,064 | 8/1995 | Hori et al. | 524/297 |
| 5,478,882 | 12/1995 | Summers et al. | 524/297 |
| 5,523,355 | 6/1996 | Oba et al. | 525/215 |
| 5,554,683 | 9/1996 | Oshima | 524/297 |

FOREIGN PATENT DOCUMENTS

| 0066167 | 12/1982 | European Pat. Off. . |
|---|---|---|
| 0159448 | 10/1985 | European Pat. Off. . |
| 0264675 | 4/1988 | European Pat. Off. . |
| 0489611 | 6/1992 | European Pat. Off. . |
| 0540950 | 5/1993 | European Pat. Off. . |
| 0649868 | 4/1995 | European Pat. Off. . |
| 3304954 | 8/1984 | Germany . |
| 4436486 | 4/1996 | Germany . |
| WO9418246 | 8/1994 | WIPO . |

OTHER PUBLICATIONS

Database WPI –XP002031980, Apr. 1992.
Database WPI –XP002031981, Mar. 1994.
Database WPI –XP002031982, Jun. 1980.
Database WPI –XP002031983, Jan. 1993.
Database WPI –XP002031984, Jan. 1985.
Database WPI –XP002031985, Jan. 1985.
Database WPI –XP002031986, Oct. 1991.
Database WPI –XP002031987, Sep. 1984.
Database WPI –XP002031988, Sep. 1985.
European Search Report, Jun. 16, 1997.
Journal of Japan Air Cleaning Assoc., vol. 32, No. 3, published Sep. 30, 1994, pp. 7–15, 16–25 and 43–52.

*Primary Examiner*—Vasu Jagannathan
*Assistant Examiner*—Olga Asinovsky
*Attorney, Agent, or Firm*—Young & Basile, P.C.

[57] ABSTRACT

Materials not releasing gaseous organic materials during use are used as a dry-type sealing material such as a gasket disposed upon mounting an air filter to an opening of a ceiling or the like, a wet-type sealing material filled and used in a gap for connecting wall materials or partitionings, a vinyl chloride sheet or a vinyl chloride cloth as a facing material for walls and floors. Specifically, a carboxylic acid ester having a molecular weight of not less than 400 is used as a plasticizer, a phenolic compound having a molecular weight of not less 300 is used as an antioxidant, an aliphatic hydrocarbon having not less than 19 carbon atoms (for example, microcrystalline wax) is used as a lubricant, and an alkylamine ethylene oxide adduct having a molecular weight of not less than 350 is used as an antistatic agent.

9 Claims, No Drawings

SEALING MATERIALS AND BUILDING COMPONENTS USEFUL FOR CLEAN ROOMS

BACKGROUND OF THE INVENTION

1. Field of the Invention

The present invention concerns a dry-type sealing material (ready formed product), a wet-type sealing material (room temperature curable liquid), a building component made of polyvinyl chloride for use in a clean room used, for example, in factories or research laboratories in the field of semiconductors, foodstuffs, medicines and biotechnology, a method of manufacturing them, as well as a clean room and a local facility using them.

2. Related Art Statement

In a clean room used, for example, in factories or research laboratories in the field of semiconductors, foodstuffs, medicines and biotechnology, dry air filters for trapping particulate substances suspended in air are disposed to an air introduction path and air after passing therethrough is introduced into the room. As the degree of integration of semiconductors has been increased recently, not only dusts but also diffusion of organic gases in air in the clean room have caused such a problem as follows.

It has been pointed out that organic gases are adsorbed on the surface of silicon wafers under processing for semiconductor devices in a clean room may deteriorate their characteristics (for example, Fujii, "Gaseous Contaminants and Current Situation for Countermeasure of Removing Them", Air Cleaning (Kuki Senjo), Vol. 32, No. 3, p 43 (1994), published from the Foundation of Japan Air Cleaning Society).

OBJECT OF THE INVENTION

The present invention has been accomplished for overcoming such a problem and it is an object thereof to provide a dry-type sealing material such as a gasket used upon mounting an air filter, for example, to an opening of a ceiling, which can eliminate the presence of gaseous organic materials in a clean room, a method of manufacturing the dry-type sealing material, as well as a clean room and a local facility using the same.

It is another object of the present invention to provide a wet-type sealing material used, for example, for connecting wall materials or partitioning materials, which can eliminate the presence of gaseous organic materials in a clean room, a method of manufacturing the wet-type sealing material, as well as a clean room and a local facility using the same.

It is a further object of the present invention to provide a building component made of vinyl chloride (for example, a vinyl chloride sheet covering the surface of a floor or a vinyl cloth covering the surface of a wall), which can eliminate the presence of gaseous organic materials in a clean room, a method of manufacturing the building component and a clean room using the same.

SUMMARY OF THE INVENTION

The present inventors, et al have made earnest studies for attaining the foregoing objects and have found that one of the reasons for the presence of gaseous organic materials in a clean room is attributable to a dry-type sealing material such as a gasket which is disposed for mounting an air filter to an opening of a ceiling or the like and a packing used for connecting wall materials or partitioning materials. That is, it has been found by the study of the present inventors, et al that the existent dry-type sealing materials described above release gaseous organic materials such as carboxylic acid esters, phosphoric acid esters and phenols.

Specifically, it has been found that the existent dry-type sealing materials contain liquid paraffin (aliphatic hydrocarbons of 12 to 18 carbon atoms) as a lubricant, and also contains a plasticizer and an antioxidant of relatively low molecular weight.

In a first aspect according to the present invention, there is provided a dry-type sealing material formed by molding a mixture of a raw material rubber and formulations into a predetermined shape, in which at least one of the raw material rubber and the formulations does not release gaseous organic materials.

In a preferred embodiment of the dry-type sealing material of the first aspect according to the present invention, the raw material rubber is at least one of urethane rubber, butyl rubber, ethylene propylene rubber, ethylene propylene terpolymer rubber, isoprene rubber, acrylic rubber, vinyl chloride rubber, chloroprene rubber and fluoro rubber. The raw material rubbers described above do not release gaseous organic materials. The urethane rubber used herein should not contain organic phosphoric acid compounds. The ethylene propylene terpolymer rubber is a rubber comprising a ternary copolymer of ethylene, propylene and a third ingredient.

In another embodiment of the dry-type sealing material of the first aspect according to the present invention, a main ingredient of a lubricant in the formulations is at least one of aliphatic hydrocarbons of not less than 20 carbon atoms and higher alcohols of not less than 18 carbon atoms.

In a further embodiment of the dry-type sealing material of the first aspect according to the present invention, the main ingredient of the lubricant is at least one of microcrystalline wax, natural paraffin, synthetic paraffin, polyolefin wax, branched alcohols of 18, 20 or 24 carbon atoms and oleyl alcohol.

If the main ingredient of the lubricant is an aliphatic hydrocarbon of not more than 19 carbon atoms or a higher alcohol of not more than 17 carbon atoms, gaseous organic materials are present in air in a clean room which is controlled to a temperature of 23° C. and a humidity of 30 to 40% and in which the flow rate of air passing through an air filter is about 0.3 to 0.4 m/s. However, when an aliphatic hydrocarbon of not less than 20 carbon atoms or a higher alcohol of not less than 18 carbon atoms, for example, the above mentioned embodiment is used, such gaseous materials are not present in air in the clean room.

In a further embodiment of the dry-type sealing material of the first aspect according to the present invention, a main ingredient of a plasticizer in the formulations is at least one of carboxylic acid esters, polyesters and epoxy series compounds having a molecular weight of not less than 400.

In the above-mentioned embodiment, the main ingredient of the plasticizer is preferably at least one of the following materials (a):

(a) Isononyl phthalate (molecular weight: 418), octyldecyl phthalate (molecular weight: 419), diisodecyl phthalate (molecular weight: 447), lauryl phthalate (molecular weight: 501), myristylyl phthalate (molecular weight: 530), di-2-ethylhexyl azelate (molecular weight: 413), di-2-ethylhexyl sebacate (molecular weight: 427), tris-2-ethylhexyl trimellitate (molecular weight: 547), trioctyl trimellitate (molecular weight: 547), trinonyl trimellitate (molecular weight: 570), tridecyl trimellitate (molecular weight: 612), polyester obtained by polycondensation of adipic acid, azelaic acid, sebacic acid or phthalic acid with glycol or glycerine (molecular weight: 2000–8000), epoxy fatty acid ester (molecular weight: 400–500) and epoxidized oil (molecular weight: 1000).

In the above-mentioned further embodiments of the dry-type sealing material of the first aspect according to the present invention, the raw material rubber contains chlorine atoms in the chemical structure, and the main ingredient of the plasticizer in the formulations is chlorinated paraffin having a molecular weight of not less than 400.

If the main ingredient of the plasticizer is dibutyl phthalate (molecular weight: 278), dioctyl phthalate (molecular weight: 391) or di-2-ethylhexyl adipate (molecular weight: 371), gaseous materials of them are present in air in a clean room. However, when those having a molecular weight of not less than 400, for example, as described in the aforementioned embodiments, such gaseous materials are not present in air in the clean room.

In a further embodiment of the dry-type sealing material of the first aspect according to the present invention, a main ingredient of an antioxidant in the formulations is a phenolic compound having a molecular weight of not less than 300.

In the above-mentioned embodiment, the main ingredient of the antioxidant is preferably at least one of the following materials (b):

(b) stearyl-β-(3,5-di-t-butyl-4-hydroxyphenyl)propionate (molecular weight: 520.9),
2,2'-methylene-bis-(4-methyl-6-t-butylphenol) (molecular weight: 340.5)
2,2'-methylene-bis-(4-ethyl-6-t-butylphenol) (molecular weight: 368.54)
4,4'-thiobis-(3-methyl-6-t-butylphenol) (molecular weight: 358.5)
4,4'-butylidene-bis-(3-methyl-6-t-butylphenol) (molecular weight: 382.6)
1,1,3-tris-(2-methyl-4-hydroxy-5-t-butylphenyl)butane (molecular weight: 544.8)
1.3.5-trimethyl-2,4,6-tris-(3,5-di-t-butyl-4-hydroxybenzyl) benzene (molecular weight: 775.2)
tetrakis(methylene-3-(3',5'-di-t-butyl-4'-hydroxyphenyl) propionate)methane (molecular weight: 1177.7)
bis-(3,3'-bis-(4'-hydroxy-3'-t-butylphenyl)butyric acid) glycol ester (molecular weight: 1177.7), and
tochophenol (molecular weight: 794.4).

If the ingredient of the antioxidant is 2,6-di-t-butyl-p-cresol (molecular weight: 220.4) having a molecular weight of less than 300, gaseous materials thereof are present in air in a usual clean room described previously. When a compound having a molecular weight of not less than 300, for example, a compound described in the above-mentioned embodiment is used, gaseous materials of the compound are not present in air in the clean room.

The present inventors, et al have found that the volatility is lowered and the adsorbability is increased as the molecular weight of the organic material is greater but the increase of the amount of adsorption to a silicon wafer is reduced and saturated if the molecular weight is increased to more than a predetermined value and that such a predetermined value varies depending on the molecular structure. The foregoing definition on the molecular weight of not less than 400 for the plasticizer and not less than 300 for the antioxidant has been determined on the basis of results of experiments conducted for a number of materials intended to be used.

More specifically, it is preferred that the main ingredient of the raw material rubber is butyl rubber, the main ingredient of the lubricant is microcrystalline wax, the main ingredient of the plasticizer is di-ethylhexyl sebacate and the main ingredient of the antioxidant is 2,2'-methylene-bis-(4-ethyl-6-t-butylphenol).

In a second aspect according to the present invention, there is provided a method of manufacturing a dry-type sealing material prepared by molding a mixture of a raw material rubber and formulations into a predetermined shape, wherein at least one of carboxylic acid esters, polyesters and epoxy series compounds having a molecular weight of not less than 400 is selected and used as the main ingredient of a plasticizer in the formulations.

In a third aspect according to the present invention, there is provided a method of manufacturing a dry-type sealing material prepared by molding a mixture of a raw material rubber and formulations into a predetermined shape, wherein a phenolic compound having a molecular weight of not less than 300 is selected and used as a main ingredient of an antioxidant in the formulations.

In a fourth aspect according to the present invention, there is provided a clean room of using a dry-type sealing material as defined in the first aspect according to the present invention to a portion requiring dry-type sealing.

In a fifth aspect according to the present invention, there is provided a local facility of using a dry-type sealing material as defined in the first aspect according to the present invention to a portion requiring dry-type sealing.

The local facility means, for example, a clean booth installed at a place where cleanness is intended to be improved locally, or a production facility requiring a predetermined cleanness, for example, a semiconductor production apparatus.

The present inventors, et al further have found that one of the reasons for the presence of gaseous organic materials in a clean room is attributable to a wet-type sealing material which is used being filled in a gap for connecting wall materials and partitioning materials.

That is, silicone series sealing materials have been used exclusively in existent wet-type sealing materials for clean rooms but it has been found according to the study of the present inventors, et al that the silicone series sealing materials release low molecular weight cyclic siloxanes. Further, as an alternative wet-type sealing material, polyurethane series materials may be mentioned with a view point that they do not release siloxanes and in view of fabricability and durability. It has, however, been found that the existent polyurethane series wet-type sealing materials contain liquid paraffin (aliphatic hydrocarbons of 12 to 18 carbon atoms) as a lubricant and also contains a plasticizer and an antioxidant of relatively low molecular weight.

In a sixth aspect according to the present invention, there is provided a wet-type sealing material which is filled and then cured in a gap between components, comprising a main ingredient forming a polyurethane resin after curing and an additive, in which at least one of the main ingredient and the additive does not release gaseous organic materials.

In a preferred embodiment of the wet-type sealing material of the sixth aspect according to the present invention, the main ingredient comprises a prepolymer having isocyanate groups on both terminal ends of a polyether polyol or a polyester polyol and a diisocyanate of a low molecular weight. The wet-type sealing material is a one-pack system which is cured by utilizing reaction between the isocyanate groups and moisture in air.

In a preferred embodiment of the wet-type sealing material of the sixth aspect according to the present invention, the prepolymer is obtained by reaction between polypropylene oxide as the polyether polyol, and at least one of diphenylmethane diisocyanate and toluene diisocyanate.

The polypropylene oxide used preferably has a number average molecular weight of about 10,000. A prepolymer having isocyanate groups on both terminal ends is synthesized by reacting the polyol and the diisocyanate described above, in which above, in which at least one of diphenylmethane diisocyanate and toluene diisocyanate is preferably used in view of preferred reactivity. Further, if a material of not causing yellowing is particularly necessary, dicyclohexylmethane diisocyanate is used preferably as the diisocyanate to be reacted with the polyol.

In a preferred embodiment of the wet-type sealing material of the sixth aspect according to the present invention, the low molecular weight diisocyanate is at least one of diphenylmethane diisocyanate (not containing phosphoric acid ester), dicyclohexylmethane diisocyanate (for example, 4,4'-dicyclohexylmethane diisocyanate), isophoron diisocyanate, xylene diisocyanate and norbornane diisocyanate.

The low molecular weight diisocyanate reacts with water content in air to form diamines and functions as a crosslinker between the above-mentioned prepolymers to each other. All the diamine can be reacted with isocyanate groups on the terminal ends of the prepolymer without leaving free diamines in the system by blending the diisocyanate such that the number of the isocyanate groups of the low molecular weight diisocyanate is slightly less than the number of the isocyanate groups on the terminal ends of the prepolymer. Further, if a material of not causing yellowing is particularly necessary, use of dicyclohexylmethane diisocyanate as the low molecular weight isocyanate is preferred. Further, while the diphenylmethane diisocyanate includes those containing or not containing phosphoric acid esters, those not containing phosphoric acid esters are used since the phosphoric acid esters are easily volatile in air.

In a preferred embodiment of the wet-type sealing material of the sixth aspect according to the present invention, a main ingredient of a lubricant in the additive is an aliphatic hydrocarbon of not less than 20 carbon atoms.

The main ingredient of the lubricant is, preferably, at least one of microcrystalline wax, natural paraffin, synthetic paraffin and polyolefin wax.

If the main ingredient of the lubricant is an aliphatic hydrocarbon of less than 19 carbon atoms, gaseous materials of the ingredient are present in air in a clean room which is controlled to a temperature of 23° C. and a humidity of 30 to 40% and in which the flow rate of air passing through the air filter is about 0.3 to 0.4 m/s. When an aliphatic hydrocarbon of not less than 20 carbon atoms, for example, as described in the above-mentioned preferred embodiment is used, gaseous materials of them are not present in air in the clean room.

In a preferred embodiment of the wet-type sealing material of the sixth aspect according to the present invention, a main ingredient of a plasticizer in the additive is at least one of carboxylic acid esters, polyesters, epoxy series compounds having a molecular weight of not less than 400.

The main ingredient of the plasticizer is, preferably, one of the materials (a) described previously.

If the main ingredient of the plasticizer is dibutyl phthalate (molecular weight: 278), dioctyl phthalate (molecular weight: 391) or di-2-ethylhexyl adipate (molecular weight: 371) having a molecular weight of less than 400, gaseous products of the ingredient are present in air in the usual clean room as described previously. When the material having a molecular weight of not less than 400, for example, one of the materials (a) described above is used, gaseous materials thereof are not present in the clean room.

In a preferred embodiment of the wet-type sealing material of the fifth aspect according to the present invention, the main ingredient of the antioxidant in the additive is a phenolic compound having a molecular weight of not less than 300.

The main ingredient of the antioxidant is, preferably, at least one of the materials (b) described previously.

If the main ingredient of the antioxidant is 2,6-d-t-butyl-p-cresol (molecular weight: 220.4) having a molecular weight of less than 300, the gaseous materials of the ingredient are present in the air in usual clean room described above. When the material having a molecular weight of not less than 300, for example, one of the materials (b) described previously is used, the gaseous materials thereof are not present in air in the clean room.

Further, it is preferred for the additive contained in the wet-type sealing material that the main ingredient of the lubricant is microcrystalline wax, the main ingredient of the plasticizer is di-2-ethylhexyl sebacate and the main ingredient of the antioxidant is 2,2'-methylene-bis-(4-ethyl-6-t-butylphenol).

In a seventh aspect according to the present invention, there is provided a method of manufacturing a wet-type sealing material which is filled and then cured in a gap between components, wherein at least one of carboxylic acid esters, polyesters and epoxy series compounds having a molecular weight of not less than 400 is selected and used as a main ingredient of a plasticizer in an additive.

In an eighth aspect according to the present invention, there is provided a method of manufacturing a wet-type sealing material which is filled and then cured in a gap between components, wherein a phenolic compound having a molecular weight of not less than 300 is selected and used as a main ingredient of an antioxidant in an additive.

In a ninth aspect according to the present invention, there is provided a clean room of using a wet-type sealing material as defined in the sixth aspect according to the present invention to a portion that requires the wet-type sealing.

In a tenth aspect according to the present invention, there is provided a local facility of using a wet-type sealing material as defined in the sixth aspect according to the present invention to a portion requiring a wet-type sealing.

The present inventors, et al further have found that use of vinyl chloride products (vinyl chloride sheet or vinyl chloride cloth) as a floor facing material covering the surface of a floor or a wall facing material covering the surface of a wall is preferably used in view of fabricability and durability but that such existent vinyl chloride products can not be used in order not to exist gaseous organic materials in a clean room since existent vinyl chloride products release gaseous organic materials such as carboxylic acid esters, organic phosphoric acid ester and phenols.

Then, based on the study of the present inventors, et al, it has been found that gaseous organic materials released from the existent vinyl chloride products have relatively low molecular weight, and they are attributable to a plasticizer, an antioxidant and an antistatic agent incorporated as additives.

In an eleventh aspect according to the present invention, there is provided a building component formed with a material comprising a polyvinyl chloride resin and an additive not releasing gaseous organic materials.

As actual examples of the building component, there can be mentioned, for example, a floor facing material covering the surface of a floor (vinyl chloride sheet), a wall facing material (vinyl chloride cloth) covering the surface of a wall, a skirt covering a vicinity of a boundary between a wall and a floor, and a crown covering a boundary between a ceiling and a wall.

In a preferred embodiment of the building component of the eleventh aspect according to the present invention, the main ingredient of the plasticizer is at least one of carboxylic acids, polyesters and epoxy compounds having a molecular weight of not less than 400.

The main ingredient of the plasticizer is, preferably, at least one of the materials (a) described previously.

If the main ingredient of the plasticizer is dibutyl phthalate (molecular weight: 278), dioctyl phthalate (molecular weight: 391) or di-2-ethylhexyl adipate (molecular weight: 371), gaseous materials of them are present in air in a clean room. However, when those having a molecular weight of not less than 400, for example, as described in the aforementioned embodiments, such gaseous materials are not present in air in the clean room which is controlled to a temperature of 232° C. and a humidity of 30 to 40% and in which the flow rate of air passing through the air filter is about 0.3 to 0.4 m/s.

In a preferred embodiment of the building component of the eleventh aspect according to the present invention, a main ingredient of an antioxidant in the additive is a phenolic compound having a molecular weight of not less than 300.

Further, the main ingredient of the antioxidant is, preferably, at least one of the materials (b) described previously.

If the main ingredient of the antioxidant is 2,6-d-t-butyl-p-cresol (molecular weight: 220.4) having a molecular weight of less than 300, the gaseous materials of the ingredient are present in air in a usual clean room described above. When the material having a molecular weight of not less than 300, for example, one of the materials (b) described previously is used, the gaseous materials thereof are not present in air in the clean room.

In a preferred embodiment of the building component of the eleventh aspect according to the present invention, a main ingredient of an antistatic agent in the additive is at least one of alkylamine ethylene oxide adducts and alkylamide ethylene oxide adducts and having a molecular weight of not less than 350.

The alkylamine ethylene oxide adduct and the alkylamide ethylene oxide adduct having the molecular weight of not less than 350 are commercially available and may be used. Further, when the alkylamide ethylene oxide adduct is synthesized, it is necessary to previously remove low molecular weight ingredients such that the molecular weight is not less than 350 in the ethylene oxide adduct obtained since alkylamine is usually prepared from natural products having a molecular weight distribution, in which the low molecular weight ingredient is preferably removed by vacuum distillation under heating. As the condition, for example, the pressure may be reduced about to 5 mmHg at 150° C.

If the main ingredient of the antistatic agent is N,N'-bis (2-hydroxyethyl)laurylamide (molecular weight: 273) having a molecular weight of less than 350, gaseous materials of the ingredient present in air in the usual clean room described above. When at least one of the alkylamine ethyl oxides and the alkylamide ethyl oxides having a molecular weight of not less than 350 is used, the gaseous materials thereof are not present in air in the clean room.

The molecular weight of the antistatic agent is defined as not less than 350, in the same manner as the molecular weight definition for the plasticizer of not less than 400 and for the antioxidant of not less than 300, based on the result of experiments conducted for various kinds of materials intended to be used.

Actually, it is preferred that the main ingredient of the plasticizer is epoxidized soybean oil, the main ingredient of the antioxidant is 2,2'-methylene-bis-(4-methyl-6-t-butylphenol) and the main ingredient of the antistatic agent is stearylamide ethylene oxide adduct.

In a twelfth aspect according to the present invention, there is provided a method of manufacturing a building component formed with a material comprising a polyvinyl chloride resin and an additive, wherein at least one of carboxylic acid esters, polyesters and epoxy series compounds having a molecular weight of not less than 400 is selected and used as a main ingredient of a plasticizer in the additive.

In a thirteenth aspect according to the present invention, there is provided a method of manufacturing a building component formed with a material comprising a polyvinyl chloride resin and an additive, wherein a phenolic compounds having a molecular weight of not less than 300 is selected and used as a main ingredient of an antioxidant in the additive.

In a fourteenth aspect according to the present invention, there is provided a method of manufacturing a building component formed with a material comprising a polyvinyl chloride resin and an additive, wherein at least one of alkylamine ethylene oxide adducts and alkylamide ethylene oxide adducts having a molecular weight of not less than 350 is selected and used as a main ingredient of an antistatic agent in the additive.

In a fifteenth aspect according to the present invention, there is provided a clean room comprising a building component as defined in the eleventh aspect according to the present invention as at least one of a floor facing material for covering the surface of a floor, a wall facing material for covering the surface of walls, a skirt for covering a vicinity of a boundary between a wall and a floor, a crown for covering a boundary between a ceiling and a wall, and a partitioning sheet.

The partitioning sheet is a sheet for conveniently partitioning a space in the clean room, which is attached to the inside of the clean room, for example, by suspending from the ceiling of the clean room.

(Embodiments of Dry-type Sealing Material)

The dry-type sealing material of the present invention can be obtained in the same manner as the existent dry-type sealing material, by mixing and cast-molding a main material and a curing agent for the main ingredient, a plasticizer, an antioxidant and a lubricant in a case of using an urethane rubber series raw material rubber. Further, in a case of using vinyl chloride rubber, butyl rubber, fluoro rubber, chloroprene rubber, ethylene propylene rubber, ethylene propylene terpolymer rubber and isoprene rubber as the raw material rubber, the dry-type sealing material can be obtained by kneading, under heating, the rubber material as the main ingredient and known vulcanizer and vulcanization promotor used usually together with a plasticizer, an antioxidant and a lubricant as defined in the present invention, subjecting them to extrusion molding by an extrusion molding machine and then curing under heating. Details for the dry-type sealing material are explained by way of the following Example 1.

EXAMPLE 1

(Preparation of Molding Products)

Gaskets for mounting air filters and packings for connecting partitionings were molded respectively by using raw material rubbers and formulations (lubricant, plasticizer and antioxidant) shown in the following Tables 1 and 2. Chlorinated paraffin used as the plasticizer in No. 1–2 of Table 1 has 20 to 32 carbon atoms in the paraffin, a chlorination ratio of 40 to 60% and a molecular weight of not less than 400.

TABLE 1

|  |  | No. 1-1 | No. 1-2 | No. 1-3 | No. 1-4 |
|---|---|---|---|---|---|
| Material used | Raw material rubber | Urethane rubber | Vinyl chloride | Butyl rubber rubber | Fluoro rubber |
|  | Formulation Lubricant | Microcrystalline wax ($C_{34}$–$C_{50}$) (5) | Microcrystalline wax ($C_{34}$–$C_{50}$) (5) | Microcrystalline wax ($C_{34}$–$C_{50}$) (5) | Microcrystalline wax ($C_{34}$–$C_{50}$) (5) |
|  | Plasticizer | K1 (Mw = 427) (5) | Chlorinated paraffin (5) | K4 (Mw = 2000–4000) (4) | K4 (Mw = 2000–4000) (4) |
|  | Antioxidant | S1 (Mw = 520.9) (2) | S2 (Mw = 368.54) (2) | S3 (Mw = 544.8) (2) | S3 (Mw = 544.8) (3) |
| Result for analysis of organics in molding products | (P&T-GC/MS method) Amount of organics released (ug/g) | 9 | 11 | 12 | 28 |
|  | (P&T-GC/MS method) Kind of organics released | not identifiable because of small peaks | not identifiable because of small peaks | not identifiable because of small peaks | not identifiable because of small peaks |
|  | (SWA method) Amount of organics adsorbed on wafer (ng/sheet) | 5 | 7 | 3 | 3 |
|  | (SWA method) Kind of organics adsorbed on wafer | not identifiable because of small peaks | not identifiable because of small peaks | not identifiable because of small peaks | not identifiable because of small peaks |
| Evaluation in the state of use | Amount of organics adsorbed on wafer (ng/sheet) | 28 | 26 | 35 | 18 |
|  | Kind of organics adsorbed on wafer | not identifiable because of small peaks | not identifiable because of small peaks | not identifiable because of small peaks | not identifiable because of small peaks |

TABLE 2

|  |  | No. 1-5 | No. 1-6 | No. 1-7 |
|---|---|---|---|---|
| Material used | Raw material rubber | Chloroprene rubber | Urethane rubber | Vinyl chloride rubber |
|  | Formulation Lubricant | Microcrystalline wax ($C_{34}$—$C_{50}$) (5) | Liquid paraffin ($C_{12}$–$C_{18}$) (4) | Liquid paraffin ($C_{12}$–$C_{18}$) (4) |
|  | Plasticizer | K1 (Mw = 2000–4000) (4) | K4 (Mw = 391) (3) | K5 (Mw = 391) (3) |
|  | Antioxidant | S3 (Mw = 544.8) (2) | S4 (Mw = 220.4) (1.5) | S4 (Mw = 220.4) (1.5) |
| Result for analysis of organics in molding products | (P&T-GC/MS method) Amount of organics released (ug/g) | 33 | 183 | 157 |
|  | (P&T-GC/MS method) Kind of organics released | not identifiable because of small peaks | $C_9$–$C_{16}$ aliphatic hydrocarbon K5, S4 | $C_9$–$C_{16}$ aliphatic hydrocarbon K5, S4 |
|  | (SWA method) Amount of organics adsorbed on wafer (ng/sheet) | 10 | 236 | 272 |
|  | (SWA method) Kind of organics adsorbed on wafer | not identifiable because of small peaks | $C_9$—$C_{16}$ aliphatic hydrocarbon K5, S4 | $C_9$—$C_{16}$ aliphatic hydrocarbon K5, S4 |
| Evaluation in the state of use | Amount of organics adsorbed on wafer (ng/sheet) | 43 | 183 | 153 |
|  | Kind of organics adsorbed on wafer | not identifiable because of small peaks | $C_9$—$C_{16}$ aliphatic hydrocarbon K5, S4 | $C_9$—$C_{16}$ aliphatic hydrocarbon K5, S4 |

In each of the tables, abbreviations indicate the following materials.
K1: Di-2-ethylhexyl sebacate
S1: Stearyl-β-(3,5-di-t-butyl-4-hydroxyphenyl)propionate
S2: 2,2'-methylene-bis-(4-ethyl-6-t-butylphenol)
S3: 1,1,3-tris-(2-methyl-4-hydroxy-5-t-butylphenyl)butane
K4: 1,3-butylene glycol adipate
S4: 2,6-di-t-butyl-p-cresol
K5: Dioctyl phthalate
S5: 2,6-di-t-butyl-4-ethylphenol
The raw material rubbers used are as follows.
<Urethane Rubber >
  Two-pack system polyurethane manufactured by Nippon Polyurethane Industry Co.
  Main agent: PURE MDI (trade name of products),
  Curing agent: polyol
<Vinyl Chloride Rubber >
  Vinyl chloride rubber manufactured by Nippon Zeon Co.
<Butyl Rubber >
  Butyl Rubber manufactured by Asahi Industry Co.
<Chloroprene Rubber >
  Neoprene rubber manufactured by Tosoh Corporation
<Fluoro Rubber >
  Fluoro rubber manufactured by Asahi Glass Co., Ltd.
(Analysis of Molding Product)
  A portion (40 mg) of each of molding products was cut out three days after curing, and the amount and the kind of gaseous organic materials released from each of the molding products were analyzed by the following P&T-GC/MS method.

Further, a portion (40 g for No. 1-1 to 1-5, 20 g for No. 1-6, 1-7) of each of the molding products was cut out, placed together with a silicon wafer (6 inch diameter) while spacing apart from each other by several centimeters in a desiccator and left for several hours, and the amount and the kind of the gaseous organic materials adsorbed on the wafer were analyzed by the following SWA method.

The results are shown collectively in each of the tables.

<P&T (Purge & Trap)-GC/MS method >

A predetermined amount of the specimen is filled in a test tube, the test tube is heated at 150° C. for 30 min while flowing a helium gas to the inside. Volatile ingredients are trapped in a trap tube cooled to −80° C., and the ingredients in the trap tube are heated rapidly to 300° C. under a helium gas stream into a gaseous state, which are introduced into a GS/MS device.

The GC device is HP-5890A manufactured by Hewlett-Packard Co. and the MS device is HP-5970B manufactured by the same company. The column for the GC device is HP-ULTRA 2 (OV-5 system) having 0.2 mm inner diameter, 25 mm length and 0.33 $\mu$m thickness, manufactured by same company. The temperature condition used upon measurement for the GC device is as follows.

Initial temperature 40° C.→temperature elevation rate 10° C./min→final temperature 280° C. (left for 15 min). Further, the carrier gas used for the GC device is helium and injected by a split method at a split ratio of 1/200. The ionization method for the MS device is an electron impact method and the detection range is 25 to 1000 at m/z.

The quantitative analysis is conducted by preparing a calibration line for an organic material identified on every peak for each of the ingredients. If plurality peaks appear, all ingredients are indicated by the concentration converted according to a calibration line based on n-decane as a standard material. Thus, the content and the kind of the volatile organic materials in the specimen are measured.

<Analysis by SWA Device >

The SWA device is a silicon wafer analyzer (trade name of products) manufactured by G. L. Science Co. having the following trap device, TCT (Thermal Desorption Cold Trap Injector) device, and GC/MS device. The trap device is adapted to desorb materials adsorbed on the surface of a wafer and trap desorbed ingredients, the TCT device is adapted to heat the ingredients trapped by the trap device to 300° C. in a helium gas stream, then introduce them into a capillary tube cooled to −130° C. with liquid nitrogen and trap them under cooling. The ingredients trapped by the TCT device are rapidly heated to 300° C. in a helium gas stream and introduced into the GC/MS device.

The GC/MS device used and the analysis conditions are the same as in the P&T-GC/MS method, by which the content and the kind of the organic materials adsorbed on the surface of the wafer are measured. According to this method, the content can be analyzed to the order of several n g ($10^{-9}$ g) per one wafer.

(Clean Room)

Blower filter units were manufactured by mounting the following air filters to the frames of blower floor units by disposing the gaskets: No. 1-1 to 1-3 and No. 1-6, 1-7 described above. Clean rooms were constructed by using the blower filter units, forming wall materials by dry-type sealing partitionings finished by baking using packings: of No. 1-1 to 1-3 and No. 1-6, 1-7 and forming floor materials by using stainless steel sheets as the facing material of a free access floor. That is, quite identical clean rooms were provided on every numbered types excepting that different kind of dry-type sealings were used.

The amount of organic materials released was less than 0.1 $\mu$g/g both for the wall materials and the floor materials according to the analysis by the P&T-GC/MS method. Further, the amount of organic materials from the filter material of the air filters used was not more than 1.0 $\mu$g/g according to the analysis by the P&T-GC/MS method.

<Air Filter >

Fibers for Filter Material

Commercially available glass fibers used for ULPA filter (coated with silicone oil during spinning) were heated in a clean air stream at 120° C. for 6 hours to remove siloxanes having not more than 10 silicon atoms Formation of Filter Material Cloth-like filter materials were formed by spreading the glass fibers into a sheet-like web of a predetermined size, overlaying the webs and impregnating a solution prepared by dissolving a processing agent of the following composition in 1:1 solvent mixture of acetone and toluene and further adding a predetermined amount of acrylic resin series binder into the webs, followed by drying.

Composition of Processing Agent

| Water repellent: | Synthesis paraffin ($C_{20}$–$C_{28}$) | 100 parts by weight |
|---|---|---|
| Plasticizer: | Epoxidized soybean oil (Mw = 1000) | 7 parts by weight |
| Antioxidant: | S1 (Mw = 520.9) | 2 parts by weight |

Composition of Sealing Material for Sealing Filter Material and Filter Frame

| Main ingredient: | Polyurethane resin | 100 parts by weight |
|---|---|---|
| Main agent: | Methylenediphenyl diisocyanate | |
| Curing agent: | Polyol type | |
| Plasticizer: | K1 (MW = 427) | 5 parts by weight |
| Antioxidant: | S2 (Mw = 368.54) | 3 parts by weight |
| Lubricant: | Synthesis paraffin ($C_{20}$–$C_{28}$) | 6 parts by weight |
| *Amount of organic materials released from the sealing material (by the same analysis method as for the dry-type sealing material) | | 4.5 $\mu$g/g |
| Filter frame: | Aluminum frame (600 mm × 600 mm × 100 mm) | |

The amount of the organic materials released from the filter material of the air filter was not more than 1 $\mu$g/g according to the analysis by the P&T-GC/MS method.

Each of the clean rooms was put to operation, a silicon wafer of 6 inch diameter was placed at the inside three days after the start of the operation and left for 6 hours, and the amount and the kind of the organic materials adsorbed on the wafer were analyzed by using the SWA device described above. The results are also shown collectively in each of the tables.

As can be seen from the results, in No. 1-1 to 1-5 corresponding to the embodiments of the present invention, gaseous organic materials present in the clean room could be reduced and the amount of the organic materials adsorbed to the silicon wafer put in the clean room could be reduced to not more than ⅕ as compared with the dry-type sealing materials (No. 1-6, 1-7) of using existent plasticizer, antioxidant, etc. of low molecular weight.

Embodiment of Wet-type Sealing Material

The wet-type sealing material according to the present invention can be obtained as described below in the same manner as the existent polyurethane series wet-type sealing material.

That is, in a case of using a one-pack system, polyol such as polypropylene oxide and a diisocyanate are at first reacted to synthesize a prepolymer having isocyanate groups on both terminal ends. A diisocyanate of low molecular weight as a crosslinker, fine calcium carbonate or silicic sand as a filler, and the plasticizer, antioxidant and the lubricant defined as described above as additives are added to the prepolymer and placed in a cylindrical cartridge and sealed with an aluminum sheet, which is pushed out by a seal gun upon use.

In a case of using a two pack system, a main agent comprising a diisocyanate and a curing agent comprising a polyol such as a polypropylene oxide are mixed upon use in which it is preferred to add fine calcium carbonate or silicic sand as the filler, the plasticizer, the antioxidant and the lubricant defined as described above as the additive are preferably added to the curing agent.

Details for the wet-type sealing material are explained in the following Example 2. In the following example, although only one-pack system is described, similar effect can also be obtained with two-pack system so long as the main ingredient and the additive are within the scope of the present invention.

EXAMPLE 2

(Constitution of the Wet-type Sealing Material)

The main ingredient (prepolymer, low molecular weight diisocyanate), additive (lubricant, plasticizer, antioxidant) and filler shown in the following Tables 3 and 4 were mixed at each of ratios (the ratio for each of the ingredients is indicated in ( ) by parts by weight based on 100 parts by weight of the main ingredient), placed in a cylindrical cartridge and then sealed, for example, with an aluminum sheet to prepare a one pack system wet-type sealing material. For No. 2-5, commercially available polyurethane series sealing material (THREE URETCH (registered trade mark) C320 manufactured by Sanyo Industry Co.) was used as it is.

TABLE 3

|  |  | No. 2-1 | No. 2-2 | No. 2-3 |
|---|---|---|---|---|
| Main ingredient | Prepolymer raw material | Polypropylene oxide MDI | Polypropylene oxide MDI | Polypropylene oxide MDI |
|  | Low molecular weight diisocyanate | MDI | MDI | MDI |
| Additive | Lubricant | Microcrystalline (wax ($C_{34}$–$C_{50}$)) (5) | Microcrystalline wax ($C_{34}$—$C_{50}$) (2) | Microcrystalline wax ($C_{34}$—$C_{50}$) (2) |
|  | Plasticizer | K3 (Mw = 427) (4) | K3 (Mw = 544.8) (4) | K4 (Mw = 2000–4000) (4) |
|  | Antioxidant | S1 (Mw = 420.4) (2) | S2 (Mw = 368.54) (2) | S3 (Mw = 544.8) (3) |
|  | Filler | Calcium Carbonate (30) | Calcium Carbonate (30) | Calcium Carbonate (30) Silica sand (25) |
| Evaluation in molding products | (P&T-GC/MS method) Amount of organics released (ug/g) | 10 | 11 | 8 |
|  | (P&T-GC/MS method) Kind of organics released | not identifiable because of small peaks | not identifiable because of small peaks | not identifiable because of small peaks |
|  | (SWA method) Amount of organics adsorbed on wafer (ng/sheet) | 5 | 7 | 3 |
|  | (SWA method) Kind of organics adsorbed on wafer | not identifiable because of small peaks | not identifiable because of small peaks | not identifiable because of small peaks |
| Evaluation in the state of use | Amount of organics adsorbed on wafer (ng/sheet) | 28 | 26 | 35 |
|  | Kind of organics adsorbed on wafer | not identifiable because of small peaks | not identifiable because of small peaks | not identifiable because of small peaks |

TABLE 4

|  |  | No. 2-4 | No. 2-5 |
|---|---|---|---|
| Main ingredient | Prepolymer raw material | Polypropylene oxide MDI | Marletted polyurethane type sealer |
|  | Low molecular weight diisocyanate | MDI |  |
| Additive | Lubricant | Liquid paraffin ($C_{12}$–$C_{16}$) (2) |  |
|  | Plasticizer | K5 (Mw = 391) (4) |  |
|  | Antioxidant | S4 (Mw = 220.4) (3) |  |
|  | Filler | Calcium Carbonate (30) |  |
| Evaluation in molding products | (P&T-GC/MS method) Amount of organics released (ug/g) | 476 | 2100 |
|  | (P&T-GC/MS method) Kind of organics | $C_{12}$–$C_{16}$ aliphatic hydrocarbon | $C_{12}$—$C_{16}$ aliphatic hydrocarbon |

TABLE 4-continued

|  |  | No. 2-4 | No. 2-5 |
|---|---|---|---|
|  | released | K5, S4 | K5, S4 |
|  | (SWA method) | 373 | 538 |
|  | Amount of organics adsorbed on wafer (ng/sheet) |  |  |
|  | (SWA method) Kind of organics adsorbed on wafer | $C_{12}$–$C_{16}$ aliphatic hydrocarbon K5, S4 | $C_{12}$–$C_{16}$ aliphatic hydrocarbon K5, S4 |
| Evaluation in the state of use | Amount of organics adsorbed on wafer (ng/sheet) | 183 | 215 |
|  | Kind of organics adsorbed on water | $C_{12}$–$C_{16}$ aliphatic hydrocarbon K5, S4 | $C_{12}$–$C_{16}$ aliphatic hydrocarbon K5, S4 |

In each of the tables, abbreviations, excepting for those described previously, indicate the following substances.

MDI: Methylenediphenyl diisocyanate(diphenylmethane diisocyanate)

TDI: Toluene diisocyanate (Cured Sample of Wet-type Sealing Materials)

Each of the sealing materials was pushed out of the cartridge by a sealing gun to prepare cured samples in the shape of 100 mm×100 mm×2 mm, respectively.

Three days after curing, a portion (40 mg) was cut out from each of the cured samples, and the amount and the kind of gaseous organic materials released from each of the cured samples were analyzed by the following P&T-GC/MS method.

Further, a portion (20 g) cut out from the cured samples was placed together with a silicon wafer (6 inch diameter) being spaced apart from each other by several centimeters and left for several hours. Then, the amount and the kind of the gaseous organic materials adsorbed on the wafer were analyzed by the SWA method described above.

The results are shown collectively in each of the tables.

(Evaluation in a Clean Room)

Blower filter units were manufactured by mounting the same air filters as in Example 1 to the frame of the blower filter units with each of the numbered wet-type sealing materials.

Clean rooms were constructed by using the blower filter units, forming wall materials by connecting the partitionings finished by baking with each of the numbered wet-type sealing materials, and forming floor materials by using stainless steel sheets as the facing material of a free access floor. That is, quite identical clean rooms were provided for each of numbered types excepting that different kinds of wet-type sealings were used.

The amount of the released organic materials was not more than 0.1 µg/g both for the wall material and the floor material according to the analysis by the P&T and GC/MS method. Further, the amount of the organic materials released from the filter material was not more than 1.0 µg/g by the analysis according to the P&T-GC/MS method for the air filter used, and the amount of the organic materials released from the gasket was 9 µg/g according to the analysis by the P&T-GC/Ms method.

Each of the clean rooms was put to operation 28 days after filling the gap between the partitioning materials by wet-type sealing, silicon wafers of 6 inch diameter were placed after three days in the inside and left for six hours, and the amount and the kind of the organic materials adsorbed on the wafers were analyzed by using the SWA device. The results are also shown collectively in each of the tables.

As can be seen from the results, for No. 2-1 to 2-3 corresponding to the embodiments according to the present invention, the amount of the gaseous organic material present in the clean room could be reduced, and the amount of the organic materials adsorbed on the silicon wafers placed in the clean rooms could be decreased to not more than ⅕ as compared with the case of the wet-type sealing materials (No. 2-4, 2-5) using existent plasticizer, antioxidant, etc. of low molecular weight.

(Embodiment of Building Component)

The building component according to the present invention includes a floor facing material (vinyl chloride sheet) for covering the surface of a floor, a wall facing material for covering the surface of a wall (vinyl cloth), a skirt for covering a vicinity of a boundary between a wall and a floor, a crown for covering a boundary between a ceiling and a wall, and a partitioning sheet, which are manufactured in the same manner as usual by kneading additives together with the polyvinyl chloride resin under heating and then molding by calendering or extrusion molding. The plasticizer, the antioxidant and the antistatic agent used are selected from those not releasing gaseous organic materials.

Details for the embodiment of the building component are to be explained in the following Example 3.

EXAMPLE 3

(Manufacture of Vinyl Chloride Products)

Using a polyvinyl chloride resin manufactured by Mitsui Toatsu Chemical Co. and using additives shown in the following Table 5 (lubricant, plasticizer and antioxidant), a vinyl chloride laying sheet A (thickness: 2.0 mm), of vinyl chloride bonding sheets B, D (thickness: 2.0 mm), vinyl chloride cloths C, E (thickness: 0.28 mm), a partitioning sheet F (thickness: 0.2 mm) were prepared. Further, electrostatic chargeability for each of the products was evaluated based on a charged voltage and a half-value period by the following method. The results are also shown collectively in the following Table 5.

<Evaluation for Chargeability>

A test piece sized 40 mm×35 mm was cut out from each of the vinyl chloride products and set to a rotating drum of a rotary static tester RST 201 (Kyodai Kaken type), and the amount of static charges generated with lapse of time was measured by a voltage detection probe while putting the specimen to rotational friction with a cotton broad cloth as a mating material (sized 25 mm×120 mm, tension: 400 g). After measurement for 5 min at a number of rotation of 400 rpm, the mating material was separated, and the state of electric discharge was measured for 10 mins. The temperature was at 22°+1° C. and the relative humidity was at 60±3% in the measuring chamber. In a usual easily chargeable material, the amount of static charges increases with lapse of time and electric discharge occurs upon stopping the rotation after 5 min and the voltage attenuates gradually. The maximum voltage up to the time of stopping the rotation is defined as a charged voltage (unit: V), and the period of time in which the maximum charged voltage decays to one-half level is defined as a half-value period (unit: sec). As the values are smaller, the material is less chargeable, that is, the performance of the antistatic agent is higher.

A floor was formed by using the vinyl chloride laying sheet and laying the sheet on an aluminum access floor, or by bonding an vinyl chloride bonding sheet B or D or a stainless steel facing material on an aluminum access floor by means of adhesives. Further, the wall facing material was formed by bonding the vinyl chloride cloth C, E or a vinyl chloride cloth manufactured by Tori Co. on the wall surface or using a partitioning finished at the surface by baking (the

TABLE 5

| | Products | Plastcizer | Antoxidant | Antistatic agent | Charged voltage (V) | Half-value period (sec) |
|---|---|---|---|---|---|---|
| A | Vinyl chloride laying sheet | Epoxidized soybean oil (Mw = 1000) (15) | S6 (Mw = 520.9) (2) | T1 (Mw = 490) (2) | 0 | 0 |
| B | Vinyl chloride bonding sheet | K2 (Mw = 447) (15) | S7 (M2 = 1177.7) (2) | T1 (Mw = 490) (2) | 0 | 0 |
| C | Vinyl chloride cloth | K4 (Mw = 2000–4000) (20) | S8 (Mw = 340.5) (3) | T1 (Mw = 490) (2) | 0 | 0 |
| D | Vinyl chloride bonding sheet | K5 (Mw = 391) (15) | S4 (Mw = 220.4) (2) | T2 (Mw = 273) (2) | 0 | 0 |
| E | Vinyl chloride cloth | K5 (Mw = 391) (20) | S4 (Mw = 220.4) (3) | T2 (Mw = 273) (2) | 0 | 0 |
| F | Partitioning sheet | K6 (Mw = 547) (32) | not used | T1 (Mw = 490) (2) | 0 | 0 |

Abbreviations in each of the tables, excepting for those described previously, indicate the following materials.

K2: Diisodecyl phthalate
K6: Tris-3-ethylhexyl trimellitate
S6: Stearyl-β-(3,5-di-t-butyl-4-hydroxyphenyl)propionate
S7: Tetrakis(methylene-3-(3',5'-di-t-butyl-4'-hydroxyphenyl)propionate)methane
S8: 2,2'-methylene-bis-(4-methyl-6-t-butylphenol)
T1: Stearylamide ethylene oxide adduct
T2: N,N'-bis-(2-hydroxyethyl)laurylamide (constituent material for clean room)
(No. 3-1 to No. 3-8)

amount of organic materials released is not more than 0.1 μg/g according to the analysis by the following P&T-GC/Ms method).

The same air filters as in Example 1 were used. A blower filter unit was manufactured by attaching the air filter to the frame of the blower filter unit by disposing the following gasket, which was attached to the opening of the ceiling.

That is, quite identical clean rooms were provided on each of numbered types except for using different floor facing materials and wall facing materials. Combinations of the floor facing materials and the wall facing materials are shown for respective numbered types in the following Table 6.

TABLE 6

| | | No. 3-1 | No. 3-2 | No.3-3 | No. 3-4 | No. 3-5 | No. 3-6 | No. 3-7 | No. 3-8 |
|---|---|---|---|---|---|---|---|---|---|
| Consti- tution | Floor facing material | A: Vinyl chloride laying sheet | B: Vinyl chloride bonding sheet | Stainless steel facing material | B: Vinyl chloride bonding sheet | D: Vinyl chloride bonding sheet | Stainless steel facing material | B: Vinyl chloride bonding sheet | Stainless steel facing material |
| | Wall surface material | baked | baked | C: Vinyl chloride cloth | C: Vinyl chloride cloth | baked | E: Vinyl chloride cloth | E: Vinyl chloride cloth | Vinyl chloride cloth of Tori |
| Amount of organics absorbed on wafer (ng/sheet) | | 28 | 30 | 25 | 33 | 363 | 358 | 536 | 426 |
| Kind of organics adsorbed on wafer | | not identi- fiable because of small peaks | not identi- fiable because of small peaks | not identi- fiable because of small peaks | not identi- fiable because of small peaks | K5, S4, T2 | K5, S4, T2 | K5, S4, T2 | K5, S4, T2 |

<Gasket>

Main ingredient: Two-pack system polyurethane manufactured by Nippon Polyurethane Industry Co. Main agent: Pure MDI (trade name of products) Curing agent: polyol Plasticizer: Di-2-ethylhexyl sebacate Antioxidant Stearyl-8 -(3,5-di-t-butyl-4-hydroxyphenyl) propionate Lubricant: Microcrystalline wax (about 34 to 50 carbon atoms)

The amount of organic materials released from the gasket was 15 $\mu$g/g by the analysis according to the P&T-GC/MS method described above.

Each of the clean rooms described above was put to operation and, after more than 7 days, silicon wafers of 6 inch diameter were placed at the inside and left for 6 hours. The amount and the kind of the organic materials adsorbed on the wafers were analyzed by using the following SWA device. The results are also shown together in Table 6.

<Analysis by SWA Device>

The SWA device is a silicon wafer analyzer (trade name of products) manufactured by G. L. Science Co. which was constituted with the following trap device, TCT (Thermal Desorption Cold Trans Injector) device and GC/Ms device. The trap device is adapted to desorb the materials adsorbed on the surface of the wafers and trap the desorbed ingredients, and the TCT device is adapted to heat the ingredients trapped by the trap device in a helium gas stream to 300° C. and then introduce the ingredients into a capillary tube cooled by liquid nitrogen to −130° C. and collect them under cooling. The ingredients trapped by the TCT device and rapidly heated in the helium gas stream to 300° C. are introduced into the GC/MS device.

The GC device is HP-5972A manufactured by Hewlett Packard Co., and the MS device is HP-7694V manufactured by the same company. The column in the GC device is HP-5 (crosslinked 5% phenylmethyl silicone) having 0.2 mm inner diameter, 25 mm length and 0.33 $\mu$m thickness manufactured by the same company. The temperature condition upon measurement by the GC device is as shown below.

Initial temperature at 40° C.—temperature elevation rate 10° C./min—final temperature at 300° C. (left for 15 min). Other conditions are the same as those for the P&T-GC/MS method, by which the content and the kind of the organic materials adsorbed on the surface of the wafers are measured. According to this method, it is possible to analyze to an order of several n g ($10^{-9}$ g) per one wafer.

(No. 3-9–No. 3-10)

A floor was formed by using a stainless steel facing material as the floor facing material, which was bonded on an aluminum access floor by means of adhesives. Further, a partitioning finished by baking at the surface (the amount of organic materials released was not more than 0.1 $\mu$g/g by according to the analysis by the following P&T-GC/MS method) was used as the wall material. Further, the above-mentioned partitioning sheets F of 1800 mm width×2700 mm height×0.2 mm thickness, or commercially available partitioning sheets (0.2 mm thickness) made of vinyl chloride (manufactured by Sekisui Chemical Co., Ltd.) were suspended by four from the ceiling of a clean room and silicon wafers of 6 inches diameter were placed in the clean room. The amount and the kind of the organic materials adsorbed on the wafers were analyzed in the same manner as for No. 3-1 to 3-8, except for the constitution of the clean room mentioned just above. The results are shown in the following Table 7.

TABLE 7

|  |  | No. 3-9 | No. 3-10 |
|---|---|---|---|
| Constitution | Floor facing material | Stainless steel facing material | Stainless Steel facing material |
|  | Wall facing material | baked | baked |
|  | Partitioning sheet | Partitioning sheet F | Commerical products |
| Amount of organics absorbed on wafer (ng/sheet) |  | 18 | 120 |
| Kind of organic adsorbed on wafer |  | not identifiable because of small peaks | K5 |

As can be seen from the results described above, according to the vinyl chloride products A–C, F corresponding to the embodiments of the building components according to the present invention, the amount of the gaseous organic materials present in the clean room could be reduced, and the amount of the organic materials adsorbed on the silicon wafers placed in the clean room could be reduced remarkably as compared with the case of the vinyl chloride products (D, E, commercially available vinyl chloride cloth, commercially available partitioning sheet) using the existent low molecular weight plasticizer, antioxidant and antistatic agent. Further, lowering of the antistatic performance was not observed even when an antistatic agent having a greater molecular weight than usual was used.

As has been described above, the amount of the gaseous organic materials released in the clean room or the local facility can be reduced according to the dry-type sealing material of the present invention.

Further, a dry-type sealing material releasing less amount of the gaseous organic materials can be manufactured by the method according to the present invention.

Further, since the clean room and the local facility according to the present invention release less amount of the gaseous organic materials as compared with the case of using the existent dry-type sealing materials, the amount of the organic materials adsorbed to silicon wafers can be reduced to improve the yield by using such a clean room or local facility (semiconductor production apparatus), for example, in a semiconductor production industry.

Further, the amount of the gaseous organic material released can be reduced in the clean room or the local facility according to the wet-type sealing material of the present invention.

Further, a wet-type sealing material releasing less amount of the gaseous organic materials can be manufactured by the method according to the present invention.

Further, since the clean room and the local facility according to the present invention release less amount of the gaseous organic materials as compared with the case of using the existent wet-type sealing materials, the amount of the organic materials adsorbed on the silicon wafers can be reduced to improve the yield by using such a clean room or local facility (semiconductor production apparatus), for example, in the semiconductor production industry.

Further, the amount of the gaseous organic materials released in the clean room can be reduced by the building components according to the present invention.

Further, building components releasing less amount of the gaseous organic materials can be manufactured by the method according to the present invention.

Further, since the clean room of the present invention releases less amount of the gaseous organic materials as compared with the case of using the existent vinyl chloride building components, the amount of the organic materials adsorbed on the silicon wafers can be reduced to improve the yield by using such a clean room, for example, in the semiconductor production industry.

We claim:

1. A dry sealing material for sealing a clean room, consisting essentially of a mixture of a raw material rubber without a compounding agent, and an organic compounding agent, the mixture molded into a predetermined shape, the organic compounding agent consisting essentially of a lubricant, a plasticizer, and an antioxidant, wherein each of the raw material rubber without a compounding agent, the organic compounding agent, and the mixture does not release gaseous organic materials in the clean room.

2. A dry sealing material as defined in claim 1, wherein the raw material rubber is selected from the group consisting of urethane rubber, butyl rubber, ethylene propylene rubber, acrylic rubber, vinyl chloride rubber, chloroprene rubber and fluoro rubber.

3. A dry sealing material as defined in claim 1, wherein the lubricant is selected from the group consisting of aliphatic hydrocarbons of not less than 20 carbon atoms and higher alcohols of not less than 18 carbon atoms.

4. A dry sealing material as defined in claim 3, wherein the lubricant is selected from the group consisting of microcrystalline wax, natural paraffin, synthetic paraffin, polyolefin wax, branched alcohols of 18, 20 or 24 carbon atoms and oleyl alcohol.

5. A dry sealing material as defined in claim 1, wherein the plasticizer is selected from the group consisting of carboxylic acid esters, polyesters and epoxy series compounds having a molecular weight of not less than 400.

6. A dry sealing material as defined in claim 5, wherein the plasticizer is selected from the group consisting of isononyl phthalate, octyldecyl phthalate, diisodecyl phthalate, lauryl phthalate, myristylyl phthalate, di-2-ethylhexyl azelate, di-2-ethylhexyl sebacate, tris-2-ethylhexyl trimellitate, trioctyl trimellitate, trinonyl trimellitate, tridecyl trimellitate, polyester obtained by polycondensation of adipic acid, azelaic acid, sebacic acid or phthalic acid with glycol or glycerine, epoxy fatty acid ester, and epoxidized oil.

7. A dry sealing material as defined in claim 1, wherein the raw material rubber contains chlorine atoms in the chemical structure, and the plasticizer consists essentially of chlorinated paraffin having a molecular weight of not less than 400.

8. A dry sealing material as defined in claim 1, wherein the antioxidant consists essentially of a phenolic compound having a molecular weight of not less than 300.

9. A dry sealing material as defined in claim 8, wherein the antioxidant is selected from the group consisting of stearyl-$\beta$-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidene-bis-(3-methyl-6-t-butylphenol), 1,1,3-tris-(2-methyl-4-hydroxy-5-t-butylphenyl)butane, 1,3,5-trimethyl-2,4,6-tris-(3,5-di-t-butyl-4-hydroxybenzyl)benzene, tetrakis(methylene-3-(3', 5'-di-t-butyl-4'-hydroxyphenyl)propionate)methane, bis-(3, 3'-bis-(4'-hydroxy- 3'-t-butylphenyl)butyric acid)glycol ester, and 14 tochophenol.

* * * * *